(12) United States Patent
Rossi

(10) Patent No.: US 11,946,229 B2
(45) Date of Patent: Apr. 2, 2024

(54) WORK MACHINE WITH SENSOR ENABLED USER CONTROL

(71) Applicant: Caterpillar Inc., Peoria, IL (US)

(72) Inventor: Alessandro Rossi, Seaham (GB)

(73) Assignee: Caterpillar Inc., Peoria, IL (US)

( * ) Notice: Subject to any disclaimer, the term of this patent is extended or adjusted under 35 U.S.C. 154(b) by 311 days.

(21) Appl. No.: 17/294,725

(22) PCT Filed: Nov. 12, 2019

(86) PCT No.: PCT/US2019/060832
§ 371 (c)(1),
(2) Date: May 18, 2021

(87) PCT Pub. No.: WO2020/106489
PCT Pub. Date: May 28, 2020

(65) Prior Publication Data
US 2022/0010531 A1    Jan. 13, 2022

(30) Foreign Application Priority Data
Nov. 19, 2018   (GB) ...................................... 1818809

(51) Int. Cl.
*E02F 9/24*    (2006.01)
*B60N 2/00*    (2006.01)
(Continued)

(52) U.S. Cl.
CPC ................ *E02F 9/24* (2013.01); *B60N 2/002* (2013.01); *B60N 2/797* (2018.02); *B60W 50/12* (2013.01); *E02F 9/2025* (2013.01); *E02F 9/2004* (2013.01)

(58) Field of Classification Search
CPC ......... E02F 9/24; E02F 9/2025; E02F 9/2004; E02F 9/00; E02F 9/16; E02F 9/20;
(Continued)

(56) References Cited

U.S. PATENT DOCUMENTS 3,011,739 A * 12/1961 Boyce ................. B64C 13/0421
244/237
3,223,193 A * 12/1965 Reynolds ........... B62D 49/0685
180/329

(Continued)

FOREIGN PATENT DOCUMENTS

FR    2880700 B1    1/2011
GB    2201758 A *   9/1988   ........... B60N 2/4693
(Continued)

OTHER PUBLICATIONS

International Search Report related to Application No. PCT/US2019/060832; dated Mar. 18, 2020.
(Continued)

*Primary Examiner* — Paul N Dickson
*Assistant Examiner* — Timothy Wilhelm

(57) ABSTRACT

A work machine comprises an armrest and a user control operable by the user to control tool or machine functions when the user's arm rests on the armrest. An armrest sensor is configured to sense the presence of the user's arm and to disable the control when the user's arm is removed from the armrest. The control may be mounted on the armrest and the armrest movable between enabling and disabling positions by the weight of the user's arm. A seat sensor may be configured to disable the control when the user leaves the seated position.

11 Claims, 3 Drawing Sheets

(51) Int. Cl.
*B60N 2/75* (2018.01)
*B60W 50/12* (2012.01)
*E02F 9/20* (2006.01)

(58) Field of Classification Search
CPC ....... B60N 2/002; B60N 2/797; B60W 50/12; A01B 76/00; B66F 9/065; B66F 9/0759; B66F 9/20
See application file for complete search history.

(56) References Cited

U.S. PATENT DOCUMENTS

| | | | | |
|---|---|---|---|---|
| 3,369,682 A * | | 2/1968 | Breault | B60P 1/6445 414/559 |
| 3,893,728 A * | | 7/1975 | Holopainen | B60N 2/143 297/344.24 |
| 4,012,014 A * | | 3/1977 | Marshall | B64C 13/0421 244/234 |
| 4,026,379 A * | | 5/1977 | Dunn | B60N 2/143 105/342 |
| 4,091,889 A * | | 5/1978 | Brown | B60K 28/00 180/336 |
| 4,478,308 A * | | 10/1984 | Klaassen | E02F 9/2004 180/326 |
| 4,496,190 A * | | 1/1985 | Barley | B60N 2/77 297/411.32 |
| 4,674,798 A * | | 6/1987 | Oeth | B60N 2/77 297/115 |
| 4,702,520 A * | | 10/1987 | Whisler | B60N 2/77 297/115 |
| 4,730,691 A * | | 3/1988 | Grigg | B62D 1/22 180/326 |
| 4,869,337 A * | | 9/1989 | Wagner | E02F 3/964 180/335 |
| 4,895,040 A * | | 1/1990 | Soederberg | G05G 1/52 180/315 |
| 4,934,462 A * | | 6/1990 | Tatara | E02F 9/2012 37/348 |
| 5,052,512 A * | | 10/1991 | Pakosh | B62D 1/22 180/326 |
| 5,086,869 A * | | 2/1992 | Newbery | B62D 1/22 180/329 |
| 5,092,408 A * | | 3/1992 | Tatara | F15B 21/08 37/348 |
| 5,120,187 A * | | 6/1992 | Weber | G05G 11/00 180/324 |
| 5,379,663 A * | | 1/1995 | Hara | G05G 9/04 345/161 |
| 5,409,079 A * | | 4/1995 | Strong | B60K 37/00 180/326 |
| 5,542,493 A * | | 8/1996 | Jacobson | G01B 7/003 180/272 |
| 5,566,778 A * | | 10/1996 | Valier | B60N 2/767 180/336 |
| 5,567,004 A * | | 10/1996 | Pietzsch | B60R 11/0264 180/326 |
| 5,678,469 A * | | 10/1997 | Lech | F16H 61/40 903/902 |
| 5,860,488 A * | | 1/1999 | Kim | B60N 2/797 192/220.3 |
| 5,924,515 A * | | 7/1999 | Stauffer | A01D 67/04 180/326 |
| 5,952,630 A * | | 9/1999 | Filion | H01H 13/702 200/52 R |
| 6,039,141 A * | | 3/2000 | Denny | B60N 2/14 296/190.01 |
| 6,135,230 A * | | 10/2000 | Schenck | E02F 9/24 180/269 |
| 6,164,285 A * | | 12/2000 | Garberg | B60K 26/00 180/326 |
| 6,202,501 B1 * | | 3/2001 | Ikari | B62D 1/12 180/332 |
| 6,226,902 B1 * | | 5/2001 | Heyne | E02F 9/2004 37/348 |
| 6,283,504 B1 * | | 9/2001 | Stanley | B60R 21/01532 297/217.2 |
| 6,450,284 B1 * | | 9/2002 | Sakyo | E02F 9/2004 340/684 |
| 6,540,300 B2 * | | 4/2003 | Piretti | A47C 1/03 297/411.36 |
| 6,577,909 B1 * | | 6/2003 | McGowan | G05B 9/02 700/79 |
| 6,585,073 B2 * | | 7/2003 | Lorenz | B60R 21/09 180/335 |
| 6,631,652 B1 * | | 10/2003 | Okazawa | E02F 9/2004 74/471 XY |
| 6,634,453 B2 * | | 10/2003 | Arthur | G05G 1/62 180/315 |
| 6,643,577 B1 * | | 11/2003 | Padgett | E02F 9/2012 318/568.18 |
| 6,715,269 B2 * | | 4/2004 | Nanlawala | A01D 75/00 296/190.01 |
| 6,840,339 B1 * | | 1/2005 | Nedele | B66F 9/20 180/19.1 |
| 6,841,741 B2 * | | 1/2005 | Kajiyama | G01G 23/005 177/144 |
| 6,851,495 B2 * | | 2/2005 | Sprinkle | F16H 61/47 180/338 |
| 6,948,398 B2 | | 9/2005 | Dybro | |
| 6,971,194 B2 * | | 12/2005 | McClelland | E02F 9/2004 180/326 |
| 6,971,471 B2 * | | 12/2005 | Baker | B60T 1/065 296/190.04 |
| 7,017,674 B2 * | | 3/2006 | Bell | E02F 9/2025 37/232 |
| 7,032,703 B2 * | | 4/2006 | Wulfert | B60R 11/0235 297/344.13 |
| 7,036,248 B2 * | | 5/2006 | Meyeres | E02F 9/2025 37/234 |
| 7,059,680 B2 * | | 6/2006 | Billger | B60N 2/919 297/344.21 |
| 7,121,608 B2 * | | 10/2006 | Billger | B60N 2/38 297/344.22 |
| 7,178,623 B2 * | | 2/2007 | Ginzel | B60K 20/02 180/315 |
| 7,210,552 B2 * | | 5/2007 | Priepke | B62D 1/10 280/771 |
| 7,243,756 B2 * | | 7/2007 | Muraro | E02F 9/2012 180/326 |
| 7,283,903 B2 * | | 10/2007 | Merten | E02F 9/166 307/10.6 |
| 7,290,635 B2 * | | 11/2007 | Bisick | B60N 2/797 180/326 |
| 7,347,299 B2 * | | 3/2008 | Billger | B66F 9/07545 180/326 |
| 7,389,845 B2 * | | 6/2008 | Longueville | B60N 2/753 180/326 |
| 7,438,318 B2 * | | 10/2008 | Sano | B60N 2/753 180/326 |
| 7,438,517 B2 * | | 10/2008 | Tanaka | A01B 63/1013 180/315 |
| 7,458,439 B2 * | | 12/2008 | Catton | B60N 2/767 248/125.8 |
| 7,484,587 B2 * | | 2/2009 | Portscheller | B60N 2/143 180/89.12 |
| 7,520,567 B2 * | | 4/2009 | Billger | B60N 2/797 180/331 |
| 7,635,045 B2 * | | 12/2009 | Shearer | E02F 9/2004 180/315 |
| 7,681,686 B1 * | | 3/2010 | Klas | B60K 26/00 180/329 |
| 7,712,571 B2 * | | 5/2010 | Proud | B60K 26/02 74/491 |
| 7,721,830 B2 * | | 5/2010 | Dunn | B62D 11/001 180/6.48 |
| 7,721,840 B2 * | | 5/2010 | McCord | B62D 1/12 180/402 |

(56) References Cited

U.S. PATENT DOCUMENTS

| | | | | |
|---|---|---|---|---|
| 7,748,490 B2* | 7/2010 | Hornick | B62D 1/02 | 180/316 |
| 7,748,785 B2* | 7/2010 | Lucas | B60N 2/797 | 297/411.35 |
| 7,757,806 B2* | 7/2010 | Bower | B60N 2/06 | 180/326 |
| 7,784,581 B1* | 8/2010 | Klas | G05G 9/047 | 297/344.21 |
| 7,806,470 B2* | 10/2010 | Steege | B60N 2/797 | 297/188.17 |
| 7,828,107 B2* | 11/2010 | Yoshikawa | F16H 59/02 | 180/323 |
| 7,857,090 B2* | 12/2010 | Ruhter | E02F 9/2004 | 172/781 |
| 7,878,288 B2* | 2/2011 | Kostak | B60N 2/777 | 180/329 |
| 7,899,597 B2* | 3/2011 | Vitale | E02F 9/2095 | 701/50 |
| 7,954,592 B2* | 6/2011 | Miyazaki | E02F 9/2004 | 180/321 |
| 8,028,787 B2* | 10/2011 | Akahane | E02F 9/2025 | 74/471 R |
| 8,039,769 B2 | 10/2011 | Asp et al. | | |
| 8,041,485 B2* | 10/2011 | Prasetiawan | E02F 9/2004 | 701/50 |
| 8,052,097 B2* | 11/2011 | Rollet | B64C 27/56 | 244/221 |
| 8,104,566 B2* | 1/2012 | Harber | E02F 9/16 | 180/326 |
| 8,157,042 B2* | 4/2012 | Fujiki | B62D 49/02 | 296/190.04 |
| 8,335,618 B2* | 12/2012 | Knapp | F02N 11/0803 | 701/84 |
| 8,434,562 B2* | 5/2013 | Miyasaka | E02F 9/2004 | 74/491 |
| 8,483,914 B2* | 7/2013 | Copeland | E02F 9/2004 | 701/50 |
| 8,579,070 B2* | 11/2013 | Nishi | B60N 2/24 | 180/336 |
| 8,763,747 B2* | 7/2014 | Jones | E02F 9/2004 | 180/326 |
| 8,775,001 B2 | 7/2014 | Phillips et al. | | |
| 8,820,700 B2* | 9/2014 | Roach | G05G 23/00 | 248/560 |
| 8,851,225 B2* | 10/2014 | Braun | B60K 26/02 | 180/324 |
| 8,931,586 B2* | 1/2015 | Wakino | B62D 33/0617 | 180/315 |
| 8,979,175 B2* | 3/2015 | Kim | B62D 33/0617 | 296/190.04 |
| 9,217,240 B2* | 12/2015 | Shibata | E02F 9/166 | |
| 9,579,800 B2* | 2/2017 | Som | G06F 3/04886 | |
| 9,592,758 B2* | 3/2017 | Mahler | B60N 2/777 | |
| 9,671,879 B2* | 6/2017 | Hisatsugu | G06F 3/0227 | |
| 9,707,865 B1* | 7/2017 | Buerkle | B60N 2/38 | |
| 9,751,572 B2* | 9/2017 | Higashiguchi | A01B 63/10 | |
| 9,777,460 B2* | 10/2017 | Wuisan | E02F 3/764 | |
| 9,797,113 B2* | 10/2017 | Tolkacz | B62D 33/06 | |
| 9,797,114 B2* | 10/2017 | Maifield | E02F 9/2012 | |
| 9,840,826 B2* | 12/2017 | Huber | B60K 37/06 | |
| 9,878,733 B2* | 1/2018 | Enomoto | B62D 1/12 | |
| 9,885,170 B2* | 2/2018 | Katayanagi | E02F 9/163 | |
| 10,072,394 B1* | 9/2018 | Wynkoop | E02F 9/2004 | |
| 10,144,316 B2* | 12/2018 | Peterson | B60N 2/14 | |
| 10,196,795 B2* | 2/2019 | Kato | E02F 3/3668 | |
| 10,227,083 B2* | 3/2019 | Teranishi | E02F 9/2004 | |
| 10,253,477 B2* | 4/2019 | Kato | E02F 9/0841 | |
| 10,370,821 B2* | 8/2019 | Muramoto | B62D 1/18 | |
| 10,391,983 B2* | 8/2019 | Klein | B60T 7/04 | |
| 10,427,617 B2* | 10/2019 | Gomez | B60N 2/79 | |
| 10,434,914 B2* | 10/2019 | Bittner | B60N 2/79 | |
| 10,471,923 B2* | 11/2019 | Jimenez | B60R 21/232 | |
| 10,597,851 B2* | 3/2020 | Isaka | E02F 9/16 | |
| 10,702,069 B2* | 7/2020 | Pelka | B60N 2/797 | |
| 10,730,467 B2* | 8/2020 | Mori | B62D 1/12 | |
| 10,744,919 B2* | 8/2020 | Brooks | B60N 2/797 | |
| 10,754,466 B2* | 8/2020 | Ochenas | B66F 9/0755 | |
| 10,779,457 B2* | 9/2020 | Barzen | B60K 35/00 | |
| 10,794,043 B2* | 10/2020 | Takenaka | B66F 9/07568 | |
| 10,800,299 B2* | 10/2020 | Feineis | B60N 2/002 | |
| 10,814,746 B2* | 10/2020 | Sailer | B62D 63/04 | |
| 10,820,473 B2* | 11/2020 | Salzman | A01B 76/00 | |
| 10,894,546 B2* | 1/2021 | Vanhelle | B60W 40/08 | |
| 10,941,543 B2* | 3/2021 | Myers | F15B 13/022 | |
| 10,994,778 B2* | 5/2021 | Benck | E02F 9/225 | |
| 11,155,166 B2* | 10/2021 | Cobo | E02F 9/2083 | |
| 2002/0145325 A1* | 10/2002 | Clevenger | G05G 1/62 | 297/411.32 |
| 2002/0157498 A1 | 10/2002 | Black | | |
| 2003/0184123 A1* | 10/2003 | Amamiya | B60N 2/797 | 296/190.01 |
| 2005/0039966 A1* | 2/2005 | Tetsumei | B60R 21/0152 | 180/273 |
| 2006/0000656 A1* | 1/2006 | Bisick | B60N 2/797 | 180/272 |
| 2006/0232116 A1* | 10/2006 | Jang | E02F 9/24 | 297/354.1 |
| 2007/0151835 A1* | 7/2007 | Rakers | B60K 37/06 | 200/313 |
| 2007/0295551 A1* | 12/2007 | Proud | B60K 26/02 | 180/333 |
| 2008/0066988 A1 | 3/2008 | Asp et al. | | |
| 2008/0193260 A1* | 8/2008 | Yokokohji | G05G 9/04 | 901/4 |
| 2008/0277190 A1* | 11/2008 | McCord | B62D 1/22 | 180/443 |
| 2009/0206641 A1* | 8/2009 | Brown, Jr. | A47C 7/723 | 297/217.3 |
| 2012/0229394 A1* | 9/2012 | Ehrl | G06F 1/1607 | 345/173 |
| 2015/0130712 A1* | 5/2015 | Hirai | G06F 3/04883 | 345/157 |
| 2015/0360593 A1* | 12/2015 | Mahler | B60N 2/767 | 297/411.32 |
| 2016/0306424 A1* | 10/2016 | Vanhelle | G06F 3/016 | |
| 2018/0170227 A1* | 6/2018 | Shirota | B60K 35/00 | |
| 2018/0230675 A1* | 8/2018 | Kato | B60P 1/04 | |
| 2019/0389352 A1* | 12/2019 | Koller | B60N 2/77 | |
| 2021/0261205 A1* | 8/2021 | McConoughey | B60N 2/77 | |
| 2021/0261206 A1* | 8/2021 | McConoughey | B60N 2/38 | |
| 2022/0009564 A1* | 1/2022 | Hatta | E02F 3/963 | |
| 2023/0031436 A1* | 2/2023 | Hirose | B60N 2/002 | |
| 2023/0091890 A1* | 3/2023 | Saito | E02F 9/166 | 180/332 |
| 2023/0106216 A1* | 4/2023 | Horii | G05G 5/28 | 74/469 |

FOREIGN PATENT DOCUMENTS

| | | |
|---|---|---|
| GB | 2201758 A | 9/1988 |
| GB | 2561828 A | 10/2018 |
| JP | 2002157034 A | 5/2002 |
| WO | 2008036207 A1 | 3/2008 |
| WO | 2016133638 A1 | 8/2016 |

OTHER PUBLICATIONS

Great Britain Search Report related to Application No. 1818809.4; dated May 16, 2019.

* cited by examiner

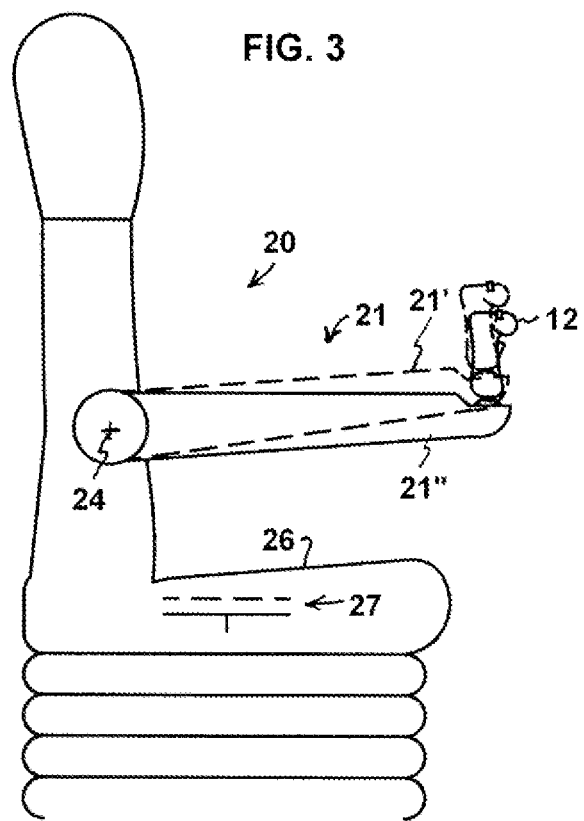
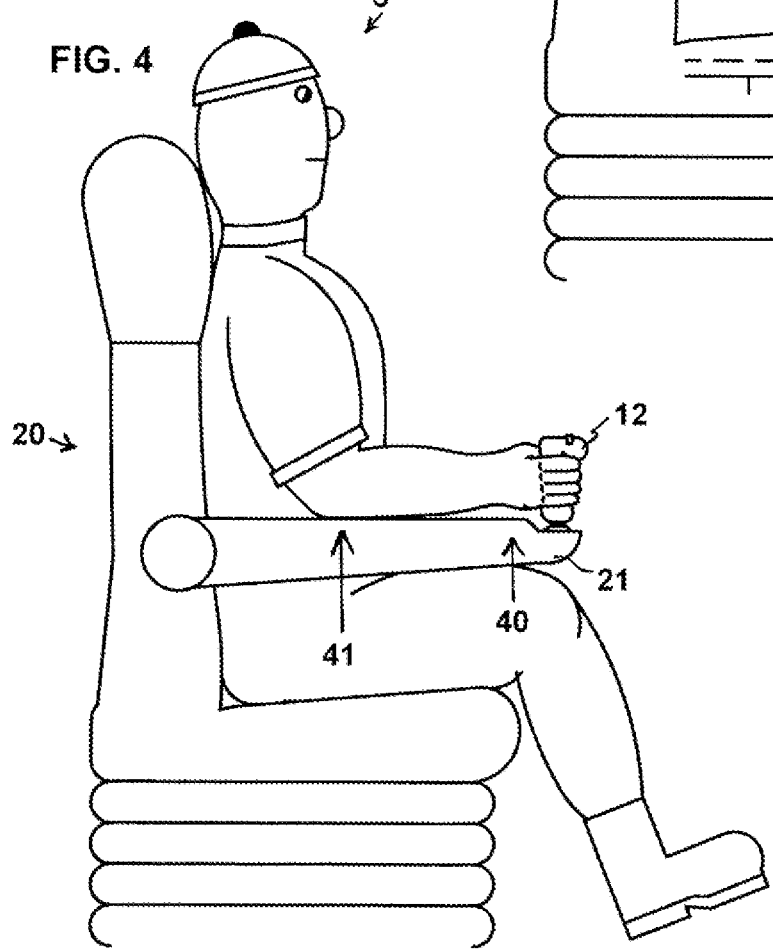

WORK MACHINE WITH SENSOR ENABLED USER CONTROL

CROSS-REFERENCE TO RELATED APPLICATION

This Application is a 35 USC § 371 US National Stage filing of International Application No. PCT/US2019/060832 filed on Nov. 12, 2019 which claims priority under the Paris Convention to Great Britain Patent Application No. 1818809.4 filed on Nov. 19, 2018.

TECHNICAL FIELD

This disclosure relates to work machines having a user control which is selectively enabled and disabled by one or more sensors.

BACKGROUND

In this specification, a work machine means a mobile, self-contained apparatus that is operable by an operator seated on or in the apparatus to manipulate a tool. Typically a work machine is configured as a steerable land vehicle mounted on wheels or tracks, although non-vehicular types are known. A tool means a work implement which is mounted on a work machine and operable to carry out work on objects or materials in the vicinity of the work machine. In many work machines the tool is movable relative to the body of the work machine, and many such tools will include parts that are movable relative to each other.

Work machines often have hydraulic power transmission systems and include excavators, backhoe loaders, wheel loaders, draglines, knuckleboom loaders, grading or surfacing machines and many other types. The tool may comprise a bucket for digging or moving loose material, a hydraulic breaker, a grab, a scraper or any other useful work implement.

The tool, the motion of the work machine over the ground surface, or combinations of these functions are controllable by one or more user controls, often configured as a lever or joystick and mounted on or proximate an armrest of the seat. In many work machines, one or more sensors will be arranged to selectively disable the controls in order to guard against inadvertent operation of the tool.

Such sensors may be arranged to detect an operation that necessarily occurs before or after use of the tool, such as moving a feature of the cabin from a position that prevents the operator from leaving the seat, to a position that allows the operator to leave the seat.

For example, WO2008036207 (A1) discloses a work machine having a joystick which is selectively enabled and disabled by rotation of an armrest in vertical and horizontal planes.

Alternatively, sensors may be arranged to detect the presence or position of the operator directly. This ensures that the control cannot be enabled when the operator is not present. In practice however, some users can find it uncomfortable to maintain the correct hand or body position to activate such sensors so as to maintain the control in an enabled condition for the duration of a work cycle.

U.S. Pat. No. 7,121,608 B2 discloses a work machine having a swivelling seat and controls that are selectively enabled and disabled depending on the position of the seat by different sensors for sensing the foot, leg, hand, or seated position of the operator.

In a different technical field, U.S. Pat. No. 8,775,001 B2 discloses a wheelchair in which a joystick control is activated by a sensor mounted in the armrest and operable by a detectable component worn by the user when the operator's hand, wrist or arm is in a normal operating position.

SUMMARY

In a first aspect of the present disclosure there is provided a work machine including a tool, a seat, an armrest, a control system, and an armrest sensor. The control system includes a control operable by a left or right hand of an operator to control the work machine or the tool when the operator is seated in the seat and a corresponding, left or right arm of the operator is resting on the armrest. The armrest sensor is configured to operate the control system: to enable the control responsive to sensing application of the operator's arm to the armrest, and to disable the control responsive to sensing removal of the operator's arm from the armrest.

In another aspect, the disclosure provides a method comprising operating the control system, by an armrest sensor: to enable the control responsive to sensing application of the operator's arm to the armrest, and to disable the control responsive to sensing removal of the operator's arm from the armrest.

The control may be mounted on the armrest.

The armrest sensor may be configured to operate the control system to enable the control responsive to sensing application of the operator's arm in any of at least two alternative positions to the armrest.

The armrest sensor may be configured to operate the control system: to enable the control responsive to sensing application of force to the armrest, and to disable the control responsive to sensing relief of said force from the armrest.

For example, the armrest, or an upper surface of the armrest, may be downwardly movable by said application of force against an upwardly directed restoring force from an upward, disabling position to a downward, enabling position, and upwardly movable by the restoring force from the enabling to the disabling position, the armrest sensor being configured to sense said application and relief of force by upward and downward movement of the armrest between the disabling and enabling positions.

The work machine may further include a seat sensor configured to operate the control system: to enable the control responsive to sensing presence of the operator in a seated position on the seat, and to disable the control responsive to sensing absence of the operator from the seated position.

The seat sensor may be configured to operate the control system: to disable the control responsive to sensing absence of the operator from the seated position for a time period longer than a delay interval, and not to disable the control responsive to sensing absence of the operator from the seated position for a time period shorter than the delay interval.

In this case, the armrest sensor may be configured to operate the control system to disable the control, either immediately or within a time period shorter than the delay interval, responsive to sensing removal of the operator's arm from the armrest.

The above mentioned optional features may be provided individually or in any desired combination.

BRIEF DESCRIPTION OF THE DRAWINGS

Further features and advantages will become evident from the illustrative embodiments which will now be described, purely by way of example and without limitation to the scope of the claims, and with reference to the accompanying drawings, in which:

FIG. 3 shows a seat of the work machine;

FIG. 4 shows the seat in use; and

Figure 1:
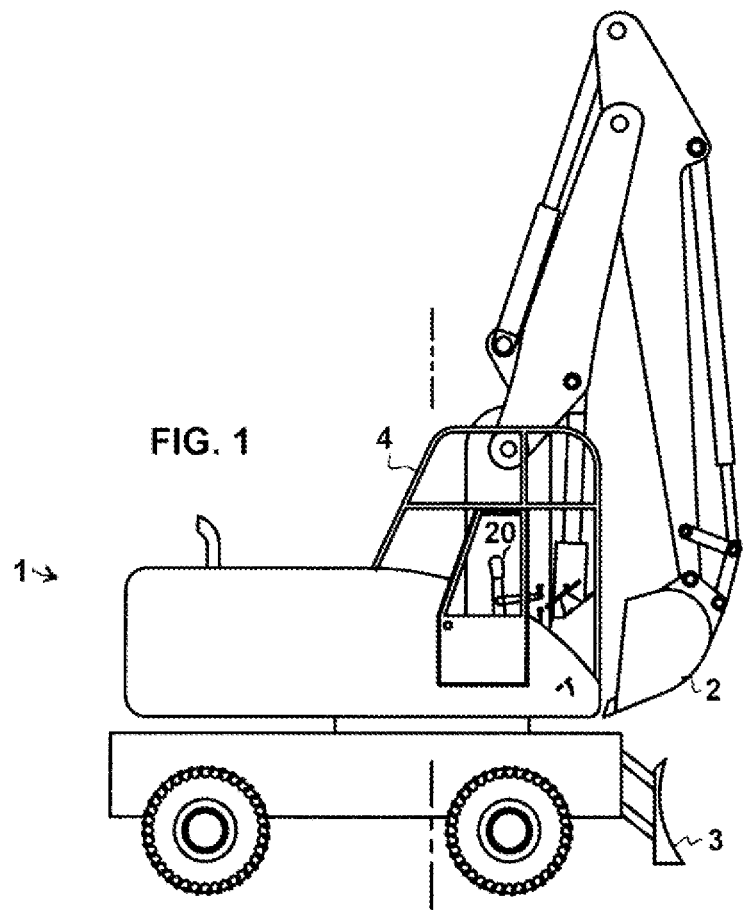
FIG. 1 shows a work machine in accordance with a first embodiment.
Figure 2:
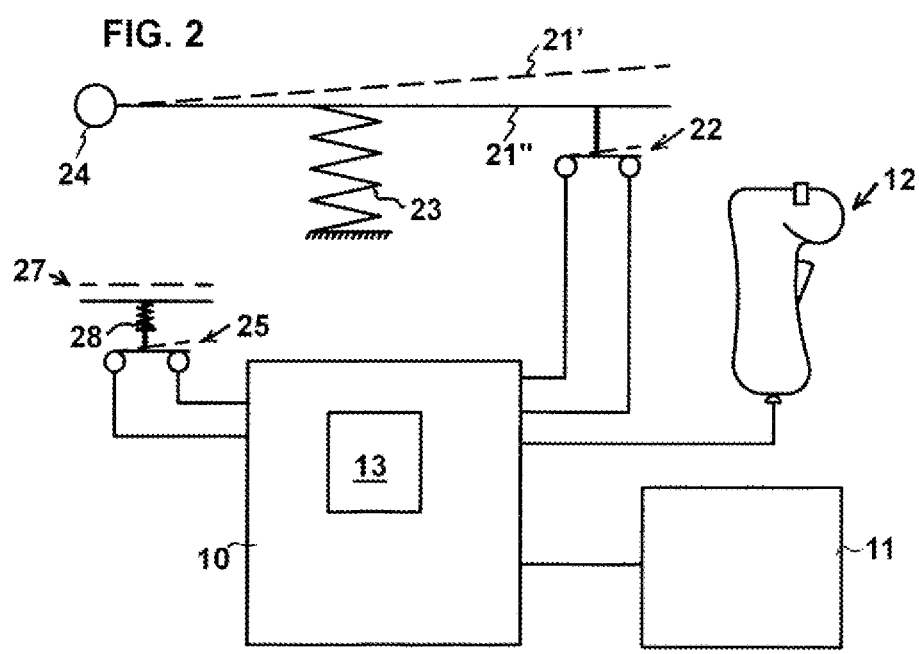
FIG. 2 shows a control system of the work machine.

Reference numerals appearing in more than one of the figures indicate the same or corresponding features in each of them.

DETAILED DESCRIPTION

Referring to FIGS. 1-4, a vehicular work machine 1 includes tools 2, 3 operable by a hydraulic power transmission system (not shown) which in turn is controlled by a valve control unit 11 of a control system 10. The machine 1 has a cabin 4 for the operator which includes a seat 20 with an armrest 21.

The control system 10 includes a control 12 which is operable by the right hand of an operator 5 to control the work machine or one or more of the tools when the operator is seated in the seat and the right arm of the operator is resting on the armrest 21, as shown in FIG. 4. In the illustrated embodiment, the control 12 is configured as a joystick with various additional switches and functional elements, and is mounted on a distal end of the armrest 21.

The armrest 21 includes an armrest sensor 22, which is configured to sense the application of the operator's arm to the armrest and the removal of the operator's arm from the armrest.

The armrest sensor may be configured to detect the force or pressure applied to the armrest by the weight of the operator's arm resting upon it, or otherwise to detect the presence of the operator's arm by any suitable contact or non-contact sensing technology, or a combination of different technologies.

The armrest sensor 22 is configured to operate the control system 10 to enable the control 12 responsive to sensing the application of the operator's arm to the armrest, and to disable the control 12 responsive to sensing the removal of the operator's arm from the armrest. It is to be understood that enabling and disabling the control means selectively arranging for operator input to the control (e.g. manipulation of the joystick or operation of the switches) to cause movement or other functional output of the tool or machine in the enabled condition, but not in the disabled condition. For example, the control system 10 may interrupt output signals from the control 12 in the disabled condition, and re-establish those signals in the enabled condition.

In the illustrated embodiment, the control 12 is configured in the enabled condition to send signals via the control system 10 to the hydraulic valve control unit 11 so as to control movement of the tools 2, 3 and/or vehicle wheels responsive to moving the joystick and switches. When the control 12 is disabled, the signals are interrupted so that operator input to the control 12 has no effect on the operation of the vehicle and its tools.

In the illustrated embodiment, the armrest sensor 22 is configured to operate the control system 10 to enable the control 12 responsive to sensing application of downward force to the armrest 21 by the weight of the operator's arm resting upon it, and to disable the control 12 responsive to sensing the relief of the downward force from the armrest 21 when the operator lifts that arm away from the armrest.

To accomplish this, an upper surface of the armrest or, as shown, the entire armrest 21 may be downwardly movable by the application of said weight or downward force against an upwardly directed restoring force supplied for example by a return spring 23 from an upward, disabling position (21', FIG. 3) to a downward, enabling position (21", FIG. 3). The armrest is upwardly movable by the restoring force which returns it from the enabling position 21" to the disabling position 21'.

The armrest sensor 22 is configured to sense this application and relief of force by the upward and downward movement of the armrest 21 about its pivot axis 24 between the disabling and enabling positions, and may be configured for example as a simple, mechanically or magnetically operated switch or equivalent device as shown.

It will be understood of course that the relief of force, or the removal of the operator's arm, is sensed simply as that condition in which the force applied by the operator's arm, or the presence of the operator's arm, is no longer sensed. Thus, the disabling position 21' of the armrest need not be clearly defined; rather, the armrest sensor 22 may supply an output signal corresponding to the disabling position, at that point when the armrest 21 is sensed not to be in the enabling position 21".

Where the control 12 is mounted on the armrest, for example, at a distal end of the armrest as shown, the operator may raise their arm from the armrest 21 without removing their hand from the control 12 so that the downward force applied by the operator via the control 12 to the armrest will maintain the armrest in the enabling position 21". In this way the operator is able to shift the position of their arm without interrupting their work. However, if the operator releases the control, then lifting the arm from the armrest 21 will cause the spring 23 to move the armrest upwardly to the disabling position 21'.

By configuring the entire armrest to move between the enabling and disabling positions, it is possible for the operator to move their arm position, for example, to rest their elbow or their wrist alternatively on the armrest. Thus, the armrest sensor 22 is configured to enable the control 12 responsive to sensing application of the operator's arm in any of at least two alternative positions 40, 41 to the armrest.

In the illustrated embodiment, a seat sensor 25 is provided for sensing the presence of the operator in a seated position on the seat as shown in FIG. 3, and the absence of the operator from the seated position as shown in FIG. 4. It will be understood that the seated position is sensed as that position in which the operator's weight is (principally) supported by the upwardly facing seat surface 26, and the absence of the operator from the seated position is sensed as that condition in which the operator's weight is no longer supported thereby.

The seat sensor may comprise a pressure sensor, a proximity sensor or any other suitable arrangement that detects when the operator is seated. In the illustrated embodiment the seat sensor 25 is integrated into the seat 20 as a simple, mechanically or magnetically operated switch or equivalent device, which detects the presence of the operator in the seated position by the movement of a pressure pad 27 which is upwardly biased to a rest position by a return spring 28 and moved downwardly by the weight of the operator on the seat surface 26. Since the operator's weight applies a substantial force to the pad 27 the seat sensor can distinguish with high reliability between the seated position and the absence of the operator from the seated position.

The seat sensor 25 is configured to operate the control system 10 to enable the control 12 responsive to sensing the presence of the operator in a seated position on the seat (FIG. 3), and to disable the control 12 responsive to sensing the absence of the operator from the seated position (FIG. 4). Optionally, the seat sensor 25 may be configured to operate the control system 10 to disable the control 12 responsive to sensing the absence of the operator from the seated position for a time period longer than a delay interval, but not to disable the control 12 responsive to sensing the absence of the operator from the seated position for a time period shorter than the delay interval. The control system 10 may include a timer 13 for this purpose along with a processor, memory, and software for implementing the control logic as known in the art.

A short delay interval of a few seconds, for example, from about 1 second to about 15 seconds, particularly from about 2 seconds to about 10 seconds, may be selected to allow enough time for the operator to shift their position in the seat or to momentarily scan the immediate environment of the work machine before settling back into the seat. For example, a delay interval of about 5 seconds may be suitable.

Further optionally, the armrest sensor 22 may be configured to operate the control system 10 to disable the control 12, either immediately or within a time period shorter than the delay interval, responsive to sensing removal of the operator's arm from the armrest 21.

Figure 5:
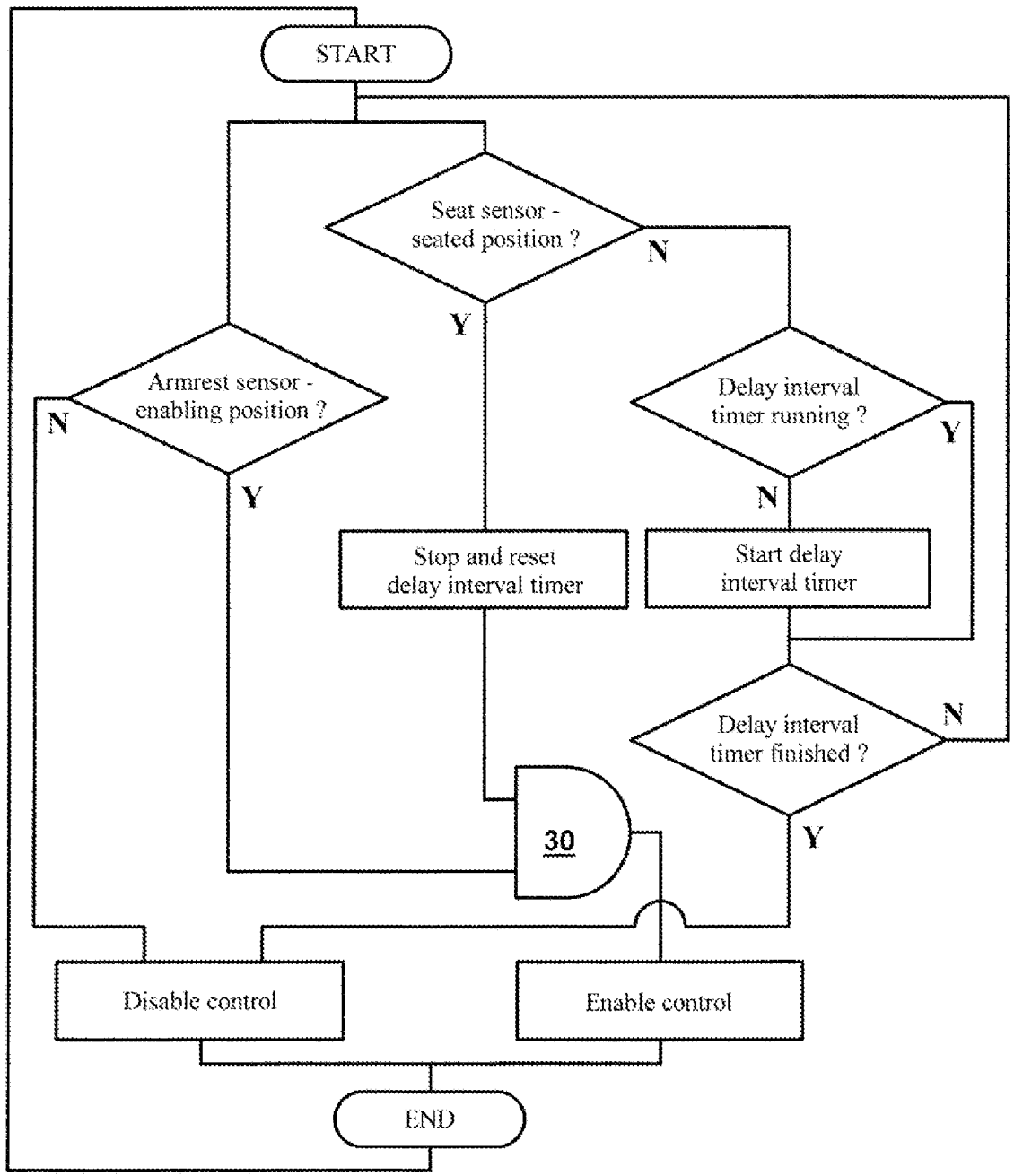
FIG. 5 shows the logic of the control system.

FIG. 5 illustrates one simplified, non-limiting example showing how these functions may be combined in a logical sequence which can be run iteratively from "Start" to "End" at any desired frequency, with "Y" and "N" representing "Yes" and "No" respectively. With respect to the decision point: "enabling position?", "Y" and "N" represent the armrest sensor 22 outputs, respectively in the enabling and disabling positions of the armrest 21. With respect to the decision point: "seated position?", "Y" and "N" represent the seat sensor 25 outputs, respectively for the sensed presence or absence of the operator with respect to the seated position.

The armrest sensor 22 and seat sensor 25 output signals are combined in a Boolean "AND" function 30 to enable the control 12, and are configured in effect as a Boolean "OR" function to disable the control 12.

INDUSTRIAL APPLICABILITY

It is known that the operator of a work machine will make many slight changes in their body position during the course of their work shift in order to remain comfortable and avoid fatigue. It is found however that where an armrest is provided to support the operator's left or right arm during operation of the control by the corresponding, left or right hand (i.e. the hand of the same arm that rests on the armrest), the operator will tend to maintain that arm on the armrest at all times when operating the control for the duration of the work shift.

Thus, the presence of the operator's arm on the armrest can be used as a reliable indicator of the presence of the operator in the working position, without imposing any unnecessary constraint on the normal movements of the operator in the seat.

This ensures that the control is enabled only when the operator is in the working position, while avoiding the fatigue that is often experienced with hand position sensors mounted on the control itself, or with sensors that impose positional constraints on other aspects of the operator's body position which the operator would otherwise wish to adjust for comfort during their shift.

In each of its embodiments, the armrest sensor may be configured to operate the control system to enable the control responsive to sensing application of the operator's arm in any of at least two alternative positions to the armrest. For example, the operator may rest the arm on the armrest alternatively at the wrist or the elbow. The alternative arm positions provide further freedom of movement in the seat so as to more effectively observe the operation of the tool as well as maintaining operator comfort.

This may be achieved by arranging for the armrest sensor to operate responsive to sensing application of pressure (particularly downward pressure) to the armrest, wherein said pressure may be applied anywhere on the armrest. Optionally, by mounting the control on the armrest, the pressure may be applied alternatively to the control itself and, via the control, to the armrest, providing yet further freedom of movement for the operator.

One way to achieve this is by arranging for the whole or a substantial part of the armrest (optionally, including the control) to be movable against a restoring force between an upward, disabled position and a downward, enabled position, as described with reference to the illustrated embodiment.

Alternatively, it could be achieved for example by one or more proximity sensors suitably arranged in the armrest to enable the control responsive to sensing the presence of the operator's arm in any of the alternative positions.

By combining the armrest sensor with a seat sensor, it is possible to configure the armrest sensor to provide still greater freedom of movement for the operator (for example, by reducing the threshold force required to be applied to the armrest to enable the control, or increasing the surface area over which the presence of the operator's arm will be detected), without incurring an increased risk of inadvertent operation. The seat sensor disables the control when the operator is absent from the seated position, so that both the seat sensor and the armrest sensor must be in the enabled condition in order to enable the control.

Optionally, by configuring the seat sensor to disable the control only responsive to sensing absence of the operator from the seated position for a time period longer than a predefined delay interval, the operator is afforded greater freedom of movement to briefly shift position in the seat or to move to check the environment close to the machine body, without compromising the safety afforded by the armrest sensor.

By configuring the armrest sensor to disable the control, either immediately on sensing the absence of the operator's arm or within a time period shorter than the seat sensor delay interval, the sensors in combination may discriminate more quickly between the situation where the operator finishes work with the tool and stands up to do something else or leave the cabin, and the situation where the operator moves briefly in the seat while continuing to manipulate the tool.

In summary, a work machine comprises an armrest and a user control operable by the user to control tool or machine functions when the user's arm rests on the armrest. An armrest sensor is configured to sense the presence of the user's arm and to disable the control when the user's arm is removed from the armrest. The control may be mounted on the armrest and the armrest movable between enabling and disabling positions by the weight of the user's arm. A seat sensor may be configured to disable the control when the user leaves the seated position.

In each of its embodiments, the armrest sensor may be combined with other safety features as known in the art. For example, the armrest including the armrest sensor may be manually movable, or further movable, between different rest positions as known in the art to provide access for the operator to enter and leave the seat and/or to provide an additional safety function by disabling the control in one rest position (representing the non-use condition) and enabling the control (subject of course to the operation of the armrest sensor and, where fitted, the seat sensor) in the other rest position.

So for example, where the armrest sensor is activated by movement of the armrest, the armrest may be movable from a first (inactive) rest position to a second (active) rest position, wherein a further safety sensor is arranged to disable the control responsive to sensing the first rest position of the armrest, and then further movable against a restoring force from the second rest position (in which the armrest sensor disables the control) to the enabled position in which the armrest sensor enables the control.

The armrest may be mounted on a back or other structural component of the seat, for example as illustrated, or alternatively on another part of the structure of the work machine proximate the other seat components. The armrest and the other seat components may be fixed or movable relative to each other. In each case however, the armrest is located in a position to support the operator's arm when the operator is in the seated position and the operator is operating the control with the hand of that same arm.

The control may be mounted on the armrest or proximate the armrest.

In alternative embodiments, either or each of the armrest sensor and seat sensor may comprise one or more sensors based on any suitable contact or non-contact sensing technology or, for better performance, combining more than one such technology, including sensors operable by force or pressure or movement and proximity sensors for detecting solid objects as well known in various applications.

The control may be configured as a joystick, lever, switches, touch screen or any other user interface for manipulating the tool or controlling the movement of the work machine over the ground (e.g. as a secondary steering system for off-road use), or combinations thereof.

Many further adaptations are possible within the scope of the claims.

In the claims, reference numerals in parentheses are provided purely for ease of reference and are not to be construed as limiting features.

The invention claimed is:

1. A work machine comprising:
   a tool;
   a seat;
   an armrest;
   a control system, the control system including a control operable by a left or right hand of an operator to control the work machine or the tool when the operator is seated in the seat and a corresponding, left or right arm of the operator is resting on the armrest;
   an armrest sensor; and
   a timer adapted to measure a time period between the armrest sensor sensing the presence of the operator arm and the armrest sensor not sensing the presence of the operator arm;
   wherein the armrest sensor is configured to operate the control system:
   to enable the control responsive to sensing application of the operator's arm to the armrest and the timer, and
   to disable the control responsive to sensing removal of the operator's arm from the armrest and the timer.

2. The work machine according to claim 1, wherein the armrest sensor is configured to operate the control system:
   to enable the control responsive to sensing application of force to the armrest, and
   to disable the control responsive to sensing relief of said force from the armrest.

3. The work machine according to claim 2, wherein the armrest, or an upper surface of the armrest, is downwardly movable by said application of force against an upwardly directed restoring force from an upward, disabling position to a downward, enabling position, and is upwardly movable by the restoring force from the enabling to the disabling position, and the armrest sensor is configured to sense said application and relief of three by upward and downward movement of the armrest between the disabling and enabling positions.

4. The work machine according to claim 3, wherein the control is mounted on the armrest.

5. The work machine of claim 4, wherein the control mounted on the arm rest is a joystick.

6. The work machine according to claim 1, wherein the armrest sensor is configured to operate the control system to enable the control responsive to sensing application of the operator's arm in any of at least two alternative positions to the armrest.

7. The work machine according to claim 1, further including a seat sensor configured to operate the control system:
   to enable the control responsive to sensing presence of the operator in a seated position on the seat, and
   to disable the control responsive to sensing absence of the operator from the seated position.

8. The work machine according to claim 7, wherein the seat sensor is configured to operate the control system:
   to disable the control responsive to sensing absence of the operator from the seated position for a time period longer than a delay interval, and
   not to disable the control responsive to sensing absence of the operator from the seated position for a time period shorter than the delay interval.

9. The work machine according to claim 8, wherein the armrest sensor is configured to operate the control system to disable the control, either immediately or within a time period shorter than the delay interval, responsive to sensing removal of the operator's arm from the armrest.

10. A method of controlling a work machine, the work machine comprising:
    providing a tool, a seat, an armrest, a timer, and a control system, the control system including a control operable by a left or right hand of an operator to control the work machine or the tool when the operator is seated in the seat and a corresponding, left or right arm of the operator is resting on the armrest;
    operating the control system, by an armrest sensor:
    timing a time period between sensing application of the operator's arm to the armrest and removal of the operator's arm from the armrest;
    comparing the time period to a delay interval;
    enabling control responsive to sensing application of the operator's arm to the armrest, when the time period is more than the delay interval; and
    disabling control responsive to sensing removal of the operator's arm from the armrest when the time period is more than the delay interval.

11. The method of claim 10, wherein the control is provided as a joystick.

* * * * *